(12) United States Patent
Reddy et al.

(10) Patent No.: US 8,671,105 B2
(45) Date of Patent: Mar. 11, 2014

(54) DATA INTEGRATION USING CONCEPTUAL MODELING FRAMEWORK

(75) Inventors: Sreedhar Sannareddy Reddy, Pune (IN); Prasenjit Das, Kolkata (IN); Raghavendra Reddy Yeddula, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 179 days.

(21) Appl. No.: 13/220,277

(22) Filed: Aug. 29, 2011

(65) Prior Publication Data

US 2012/0059840 A1 Mar. 8, 2012

(30) Foreign Application Priority Data

Sep. 3, 2010 (IN) .......................... 2456/MUM/2010

(51) Int. Cl.
*G06F 17/30* (2006.01)
(52) U.S. Cl.
USPC .................. 707/763; 707/760; 707/E17.013; 707/E17.024

(58) Field of Classification Search
None
See application file for complete search history.

(56) References Cited

U.S. PATENT DOCUMENTS

| 7,367,018 | B2 | 4/2008 | Noble et al. |
| 7,596,559 | B2 | 9/2009 | Popa et al. |
| 2006/0206458 | A1* | 9/2006 | Tyma .................................. 707/3 |
| 2008/0243765 | A1 | 10/2008 | Fuxman et al. |

* cited by examiner

*Primary Examiner* — Anteneh Girma
(74) *Attorney, Agent, or Firm* — Oliff PLC

(57) ABSTRACT

A computer implemented system and method that combines data from multiple sources to provide a unified view of data using multi-layered conceptual modeling framework. The invention provides means to model conceptual data models at multiple levels of abstraction and a means to map them with each other and with physical models. A query rewriting approach adopted in the present invention is capable of translating queries down multiple levels of conceptual models into physical models and Conceptual modeling framework provide a means to capture and process semantic intent of data more accurately thereby reducing data integration errors significantly.

16 Claims, 9 Drawing Sheets

| PERSON |
| --- |
| SSN: NUMBER [PK] |
| NAME: VARCHAR2 |
| ADDR_LINE1: VARCHAR2 |
| ADDR_LINE2: VARCHAR2 |
| STATE: VARCHAR2 |
| COUNTRY: VARCHAR2 |
| FATHER_SSN: NUMBER |
| MOTHER_SSN: NUMBER |
| GENDER: VARCHARE2 |
| DOB: NUMBER |

Fig. 704

DATA INTEGRATION USING CONCEPTUAL MODELING FRAMEWORK

FIELD OF THE INVENTION

The present invention relates to a system and method for data integration in an enterprise application. More particularly the invention relates to modeling of data existing in multiple layers within a hierarchical classification structure and a means to map the data using a conceptual modeling framework.

BACKGROUND OF THE INVENTION

The term data integration refers to the problem of combining data residing in heterogeneous sources in order to provide a unified view of the data. Currently, it relates to wide range of technologies, from extract, transform and load (ETL) to enterprise application integration (EAI) to enterprise information integration (EII) and various change propagation technologies. There has been extensive theoretical research on data integration systems, exploring various mapping systems and languages, and their complexity results and limitations.

Several commercial integration systems which exist under the brand name of "enterprise information integration" usually support GAV (global-as-view) mappings. But most of these are two layered relational systems, where a global relational schema is mapped to data source specific schemas. However, in a real-life enterprise system, it is common for data to exist in a hierarchy of contexts—for instance at the enterprise level, division level, department level, function level and so on, each with its own local context and context specific assumptions. A two layered relational system is not adequate to model this complexity. Therefore the need of the art is to have richer conceptual models that allow to model data entities at multiple levels of abstraction and capture the relationships that exist between them. It is also required to have a means to map these context specific conceptual models in a hierarchical manner, for instance from function to department, from department to division, and from division to the enterprise level. Further, in the present scenario aggregated view of the data is achieved by creating, storing and maintaining data in warehouses at each of the intermediate levels within a hierarchical system. This involves large amount of time, efforts and computational resources at each of these enterprise levels. Moreover, consistency of the data to be maintained at each of these enterprise levels by way of data synchronization is an added responsibility and burden for the existing systems. For instance, U.S. Pat. No. 7,367,018 discloses a Computer method and apparatus for managing process and plant engineering data for chemical or other engineering processes across applications. The method and apparatus include a respective class view for each of multiple software applications, a composite class view, a conceptual data model and a resulting consolidated multi-tier data model. The multi-tier data model enables sharing of engineering and other data from the multiple software applications with other process and plant engineering applications and programs. An amalgamator synthesizes the class views, composite views and conceptual data model into the multi-tier data model. In forming the multi-tier data model, there is a one-to-one mapping between an attribute in the class view and composite class view, and a one-to-one mapping between an attribute in the composite class view and a data path in the conceptual data model to corresponding software applications from which the attribute originated.

The above prior art uses one to one mapping approach between the attributes to provide an aggregated view. However there is no mention of technique adopted to resolve the issues arising in establishing mapping rules that are required to solve complex views associated with data existing in hierarchical structure.

At another instance, U.S. Pat. No. 7,596,559 provides a system and method for data integration by querying multiple extensible markup language (XML) source schemes through a common XML target schema and a query rewriter adapted to reformulate the target query in terms of the source schemes based on the mappings, and to integrate the data based on the set of constraints. The query rewriter is adapted to rewrite the target query into a set of source queries comprising the source schemes. A processor evaluates a union of the set of source queries. The prior art is however suitable only for mapping between the data models across a single layer and is not suited for mapping between complex data models across an hierarchical level.

Another US Patent application 20080243765 discloses a method for generating nested mapping specifications and transformation queries based thereon. Basic mappings are generated based on source and target schemes and correspondences between elements of the schemes. A directed acyclic graph (DAG) is constructed whose edges represent ways in which each basic mapping is nestable under any of the other basic mappings. Root mappings of the DAG are identified. Trees of mappings are automatically extracted from the DAG, where each tree of mappings is rooted at a root mapping and expresses a nested mapping specification. This invention is only a semi automated discovery for finding a correspondence between different schemas which requires a manual input to be finally refined into mappings. Further, the invention describes an automated means to discover mappings between source and target schemas, and a means to use these mappings for query transformation, the method is limited to a two layered mapping system and the complexities associated with transforming queries across multiple hierarchical layers of models and mappings is not addressed.

Therefore, the existing solutions generally do not provide support for modeling data within real time enterprise application where the complexities of modeling are associated with data existing in a hierarchy. For a dynamic environment views are often complex and the efforts required in their design are considerable. Hence, due to the drawbacks of the conventional approaches there remains a need for a novel system that can provide unified view along with convenience during data integration by providing a unique modeling and query rewriting approach.

OBJECT OF THE INVENTION

The principal object of the present invention is to provide, a means to model enterprise data existing in a hierarchy using a conceptual modeling framework to enable a unified view of the data at enterprise level and any intermediate level within an enterprise application.

It is yet another object of the present invention to provide a rich conceptual modeling language such as an object model or an extended entity-relationship model to capture various relationships and constraints that exist in a data model.

It is an object of the present invention to capture relationships that exist between data model to map context specific data models in a hierarchical manner.

It is yet another object of the present invention to map the data models using either GAV or LAV or GLAV mapping approach.

Yet another object of the present invention is to combine GAV and LAV mappings to model complex data model relationships existing in a hierarchy.

It is an object of the invention to capture relation derivation dependencies by constructing a directed acyclic graph.

It is yet another object of the present invention to enable execution of query at any intermediate level based on mapping rules and constructed directed acyclic graphs.

It is another object of the present invention to support complex relationships ranging from hierarchical relationships to association relationships existing between data models.

It is further object of the present invention to translate a query given on global schema into an equivalent source schema by providing a query rewriting approach that guarantees maximal containment of source query in global query.

One of the objects of the present invention is also to provide a query rewriting approach that is capable of translating queries down multiple levels of a hierarchical structure for direct or indirect execution.

Another object of the present invention is to minimize the efforts employed in creating and maintaining repository of an organization's electronically stored data at each level of a hierarchy.

Yet another object of the present invention is to materialize an aggregated view of organizational information at each intermediate level of an enterprise thereby reducing the time required and other latency issues that may occur while retrieving the information existing at various storage locations.

It is yet another object of the present invention to maintain consistency within different data structures supported by disparately located databases to avoid violation of data integrity constraints that may arise during execution of query initialized by the user.

BRIEF DESCRIPTION OF THE ACCOMPANYING DRAWINGS

The foregoing summary, as well as the following detailed description of preferred embodiments, are better understood when read in conjunction with the appended drawings. For the purpose of illustrating the invention, there is shown in the drawings example constructions of the invention; however, the invention is not limited to the specific methods and system disclosed in the drawings:

FIG. 100 represents the well delineated hierarchical view of an enterprise in the present invention.

FIG. 200 highlights the mutually exclusive GAV and LAV mappings in support of embodiment for the present invention.

FIG. 704 is a diagram representing the physical modeling of census records in a preferred embodiment of the invention.

DETAILED DESCRIPTION OF THE INVENTION

Figure 100:
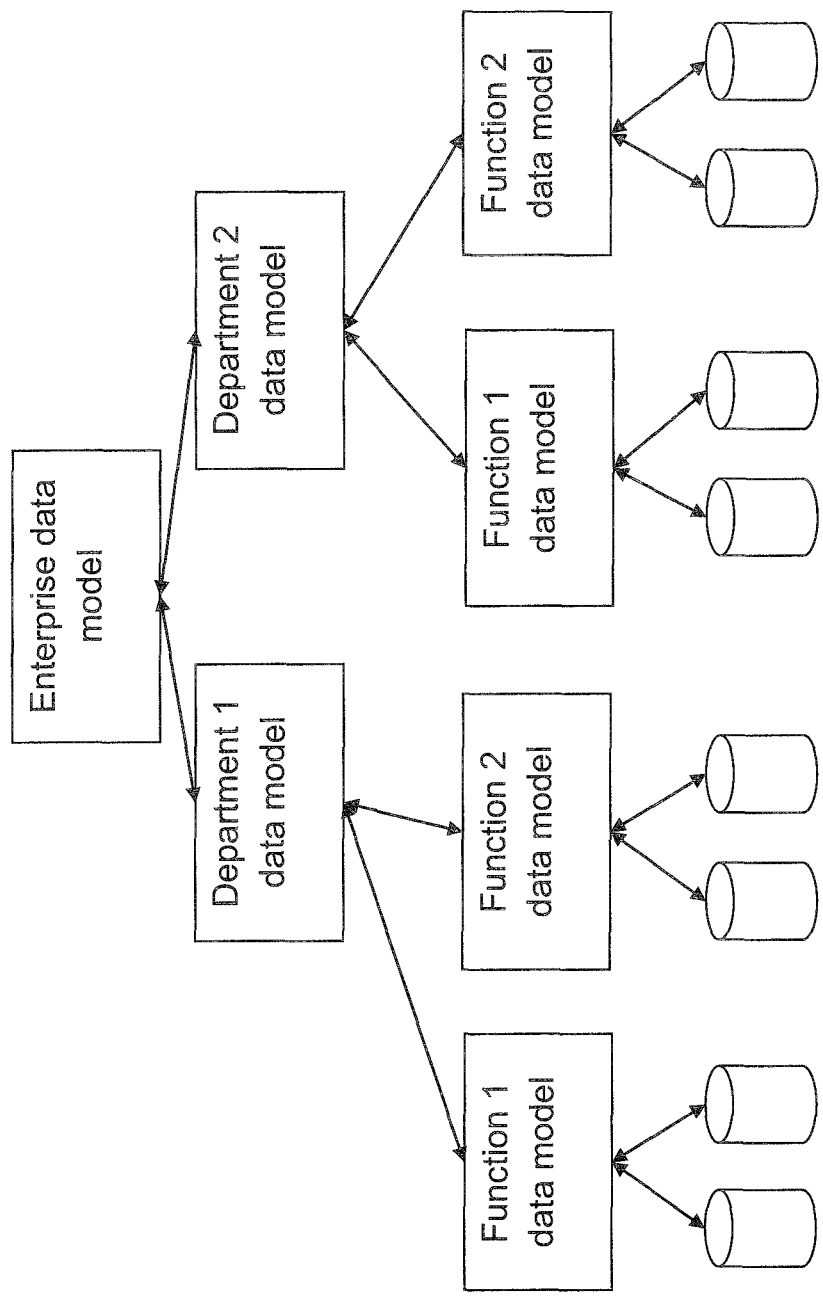

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The present invention discloses a method of providing a unified view of data existing in multi layered hierarchical structure in an enterprise application by modeling the data at multiple levels of abstraction and capturing the relationships existing between the modeled data, the said method comprising the processor implemented steps of:

defining global schema using conceptual modeling framework to provide a aggregated view of the data;

defining source schema at multiple levels using conceptual model for at least one level and relational model or a conceptual model for subsequent levels;

capturing relationship between data existing at multiple levels within an hierarchical structure;

establishing mappings and mapping rules to codify captured relationships existing between defined global schema and set of source schema;

initializing a query on global schema and rewriting into an equivalent source schema such that the query in source schema is maximally contained in global schema;

capturing relationship derivation dependencies between the data contained in defined global schema and source schema by constructing directed acyclic graph from established mapping rules and conceptual models;

processing the directed acyclic graph to construct a new mapping system that has alternating GAV and LAV mapping layers;

translating the queries down multiple levels of conceptual model into physical model queries by applying these alternating GAV and LAV mapping layers and;

executing the translated physical model query either directly or indirectly by translating it into a data flow graph that can be exported into third party ETL tools.

The aforementioned method of the present invention is implemented by system comprising of a processor to capture relationship between defined global schema and source schema and mapping rules governing the mapping between the said global schema and source schema; to construct directed acyclic graph to derive relation derivation dependencies based on established mapping rules; initialize a query on global schema into equivalent source schema; processing the directed acyclic graph to construe alternate GAV and LAV mapping layers; translating the query down multiple hierarchical level for execution within a communication network; aggregating the results from the set of source queries during query run time and displaying the translated query and results to the user using a display device; and a computer readable program storage device embodying the set of program instructions.

Next, referring to FIG. 100, a hierarchical structure of an enterprise is shown. In a large enterprise data exists in multiple hierarchical context-enterprise level, department level, function level and so on. In order to get a unified view of the data at multiple levels of an enterprise's hierarchical structure, the present invention posit a multi layered conceptual modeling framework as a means to model enterprise data integration system from lowest level operational systems to higher level enterprise structures. In the present scenario, relational models are not an appropriate medium for expressing such complex hierarchical structures. In contrary, conceptual models provides a more appropriate medium as they allow us to model hierarchical classification structures and various relationships that exists between the classes more explicitly.

In the present invention object model is chosen as a conceptual modeling language across multiple levels within a hierarchy while relational model is chosen as a modeling language at the basic physical database level of an enterprise as shown in FIG. 100 and object query language is chosen as a corresponding query language. The object model consists of class, attribute and association wherein the classes and associations can have subtype relationships. A subtype relationship can be further qualified as complete or incomplete and as overlapping or disjoint. A class can specify a subset of its attributes as a key. Association cardinalities specify constraints on participating objects. Objects are identified by unique IDs. If a class has a defined key then its object ID is modeled as a function over the key attributes.

Mappings between the object models used as a conceptual modeling language in the present invention are specified in one of the following ways:

GAV mappings, where a class or an association at some level is specified as a view over the models at the next lower level.

LAV mappings, where a class or an association at some level is specified as a view over the model at the next higher level.

GLAV mappings as a combination of GAV mapping and LAV mapping to relate classes and associations at adjacent level.

Subtype relationships, where a set of classes or associations at a lower level are specified as subtypes of a class or association at the higher level.

Mapping between an object model and a relational model used for defining global schema and source schema is specified as follows:

GAV mappings, where a class is specified as a view over a set of relations. For a class that has a primary key defined, the view must specify all its primary key attributes.

LAV mappings, where a relation is specified as a view over a set of classes.

Conceptual models as discussed above provide a means to capture and process the semantic intent of data more accurately. A query can now be initialized at any of the intermediate levels or at the enterprise level. However, it is noteworthy that a query rewriting approach has to be adopted which is capable of translating queries down multiple levels of conceptual models into physical model queries that are guaranteed to be sound and complete.

With regard to the above mentioned query rewriting approach, an algorithm for query rewriting is discussed. The description begins with a simple two-layered relational integration system and progressively refined into a multi-layered, conceptual model driven integration system. A query rewriting approach in the present invention provides a scalable solution to materialize aggregation of data from multiple sources.

Query Rewriting Approach:

Given a data integration system (G, S, M) where G is a global schema, S is a set of source schemes and M is a set of mappings between global schema G and source schema S, rewrite a given query Qg on G into an equivalent query Qs on S such that Qs is maximally contained in Qg, i.e. Qs is contained in Qg and there exists no other query Qo such that Qo is contained in Qg and Qs is contained in Qo.

It is however to be acknowledged that global model is defined using a richer conceptual modeling language such as object model or an extended entity-relationship model, and the source models are defined at multiple levels using both conceptual model and physical model. The relationships captured between the data contained within global schema and source schema includes inheritance hierarchies, association relationships, aggregate relationships, constraints and so on. The cases presented below extend to the situation where N layers of pseudo intermediate layers can be incorporated between global schema and set of source schema.

Below present are various expressive subsets of G, S and M progressing from simpler cases to more complex ones.

Combining GAV and LAV: Considered below is a situation where global schema G and source schema S are relational models and part of the schema is mapped using GAV and part of schema is mapped using LAV.

Relational Representation of a class:

Let's say there exists a class C with attributes $a_1, a_2, \ldots, a_n$;

C is represented as a relation of terms corresponding to its attributes:

$$C(id(v_1), a_1(v_2), a_2(v_3), \ldots, a_n(v_{n+1}))$$

Where 'id' is a default attribute to represent the identity of an instance of the class, and $v_1, v_2, \ldots, v_{n+1}$ are values of the corresponding attributes. 'id' is a pseudo attribute introduced for convenience, which can deal with object identity uniformly in the rewriting rules discussed below. It provides a convenient and uniform mechanism to codify inheritance relationships and association relationships.

Relational representation of an association:

Let's say there exists an association R between classes C and D with roles rc and rd respectively. We represent R as:

$$R(rc(v_1), rd(v_2))$$

Where $v_1$ is the id of C object and $v_2$ is the id of D object.

Case1: Global schema G is partitioned into two non-overlapping subsets; one mapped using GAV and the other using LAV as shown in FIG. 200

Given a data integration system D=(G, S, $M_l$, Mg), where G is the global schema, S is the set of sources $\{s_1, \ldots, Sn\}$ and where G can be divided into two mutually exclusive partitions $G_l$, Gg such that there exists a mutually exclusive partitioning of sources into two subsets $S_l$, $Sg$, such that $G_l$ is mapped to $S_l$ using LAV mapping $M_l$, and $Gg$ is mapped to $Sg$ using GAV mapping $Mg$.

D can now be converted into an equivalent two stage integration system

Figure 200:
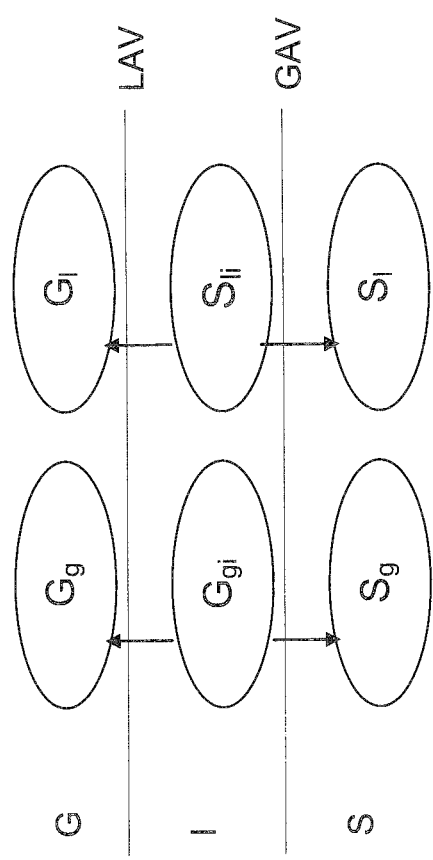

C={G, I, S, $Mi_l$, Mig} shown in FIG. 200, where,

I is a pseudo intermediate layer that has the following tables:

Ggi, as a copy of Gg (with suitable renaming of tables)

$S_l$i, as a copy of $S_l$ (with suitable renaming of tables)

$Mi_l$ is an LAV mapping between G and I that has the following components:

A one-to-one mapping between Gg and Ggi $M_l$ (after suitable name changes) between $G_l$ and $S_l$i Mig is a GAV mapping between I and S that has the following components:

A one-to-one mapping between $S_l$i and $S_l$

Mg (after suitable name changes) between Ggi and Sg

It can be proven that given a query Qg on D, Qs is maximally contained in Qg, where Qs is produced as follows:

Qg is rewritten into Qi using the LAV mapping $Mi_l$

Qi is rewritten into Qs using the GAV mapping Mig

The above mapping as shown in FIG. 200 can be specified in the following more general theorem:

Let D={G, $I_1$, $I_2$, ..., In, S, $M_1$, $M_2$, ... $M_n$, $M_{n+1}$} be a data integration system where G is the global model, $I_1$ ... $I_n$, are intermediate model layers, S is the source model, M• are GAV or LAV mappings, $M_1$ is the mapping between G and $I_1$, $M_k$ (2<=k<=n) is the mapping between $I_{k-1}$ and $I_k$, and $M_{n+1}$ is the mapping between $I_n$ and S. In D, for any query Qg on G, its maximally contained rewriting Qs (where one exists) can be obtained by successively rewriting the query Qg using the mappings $M_1$, $M_2$, ..., $M_{n+1}$.

Case 2: Some of the relations in both Global Schema G and Source Schema S are involved in both GAV and LAV mappings.

Figure 300:
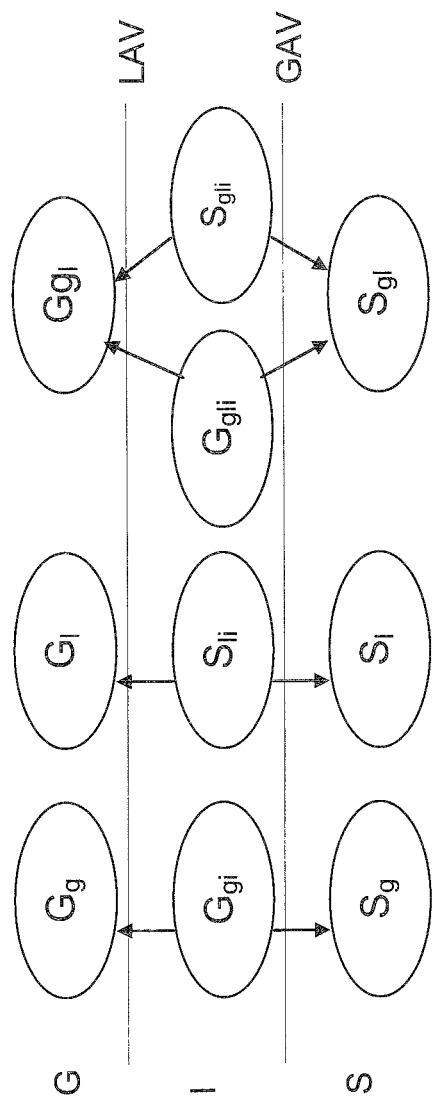
FIG. 300 illustrates the overlapping GAV and LAV mappings in support of the embodiment of the present invention.

G is partitioned into three sets $G_g$, $G_l$ and $G_{gl}$. The relations in $G_{gl}$ participate in both GAV and LAV mappings. Similarly S is grouped into three sets $S_g$, $S_l$ and $S_{gl}$ (which are not necessarily mutually exclusive). This can be modeled as shown in FIG. 300, where $G_g$, $G_l$, $G_{gi}$, $G_{li}$, $S_g$ and $S_l$ are as in case 1, and $G_{gli}$ is a copy of $G_{gl}$ (with suitable renaming of tables), $S_{gli}$ is a copy of $S_{gl}$ (with suitable renaming of tables), with a one-to-one LAV mapping between $G_{gl}$ and $G_{gli}$, original LAV mapping (after suitable renamings) between $G_{gl}$ and $S_{gli}$, original GAV mapping (after suitable renamings) between $G_{gli}$ and $S_{gl}$, and a one-to-one GAV mapping between $S_{gli}$ and $S_{gl}$.

Case 3: Supporting simple inheritance relationships between data entities

Let's say D={G, $S_c$, $S_r$, H, $M_l$, $M_g$} is our enhanced integration system Where G is the global conceptual model, $S_c$ is the source level conceptual model, $S_r$ is the source level relational schema, H is the inheritance relation (i.e. <super, sub> pairs) over G∪$S_c$, $M_l$ is the LAV mapping between G and S (i.e. $S_c$∪$S_r$), and $M_g$ is the GAV mapping between G and S.

Now, turn an inheritance relation <super=A, sub=B> (i.e. B inherits from A) into the following GAV definition:

A:–B

If more than one class (say B, C, D, ...) inherit from A, we have as many mapping rules:

A:–B

A:–C

A:–D

Let $M_i$ be the set of mapping rules so constructed to codify inheritance. From $M_l$∪$M_g$∪Mi is constructed the directed acyclic graph so as to capture relation derivation dependencies and from there the mapping layers. The directed acyclic graph for deriving relations is constructed as follows:

Let R be the set of relations and M be the set of mapping rules between the relations in R. It is assumed that each mapping rule m∈M can be identified by a unique number. It has to noted that the mapping rules governing the construction of DAG are not recursive or not really cyclic as they specify derivation paths.

The mapping dependency graph is a graph that captures relation derivation dependencies, i.e. if a relation $r_1$ is used in the derivation of a relation $r_2$, then there is a directed edge from $r_2$ to $r_1$. The nodes of the graph are the relations in R, and edges are constructed from the mapping rules M. An edge is additionally labeled by the tuple <<mapping-type>, <mapping-rule-number>> where mapping-type is either GAV or LAV, and <mapping-rule-number> identifies the mapping rule that gives rise to the edge. The construction can be well understood by the following stated example.

E.g. Suppose following are the mapping rules:

A:–B,C.(GAV)   1)

C:–D,E.(LAV)   2)

Figure 400:
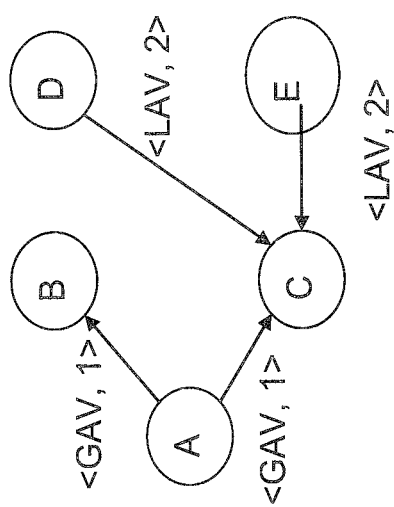
FIG. 400 is a representation of a directed acyclic graph as constructed from the mapping rules.

DAG for the above mapping rules is constructed as shown in FIG. 400. Given such a DAG, the mapping layers can be constructed as follows:

Let d be the max path length of any derivation path that is reachable starting from any relation in the global model G. The mapping scheme will have at least d+1 layers.

The first layer is G (i.e. all relations of the global model) and the last layer is S (i.e. all relations of the source model). Each intermediate layer $I_k$ (k>=1) has G∪S (with suitable renamings).

For convenience referring to the first layer (i.e. G) as $I_0$,

The mappings $M_k$ (k>=1) can be constructed as follows:

```
k = 1;
dist = 1;
prevRelSet = G;
do {
curRelSet = <the set of relation nodes reachable from $I_o$ in 'dist' number of steps>;
ruleSet = <the set of rules on edges between prevRelSet and curRelSet>;
   lavRuleSet = <the subset of ruleSet that are LAV rules>;
   gavRuleSet = <the subset of ruleSet that are GAV rules>:
   if (lavRuleSet <> NULL) {
       $M_k$ = lavRuleSet;
   For each g ∈ gavRuleSet {
Add to $M_k$ a one-to-one LAV mapping between $g_{k-1}$ and $g_k$, }
   $M_k$ is the mapping between the layers $l_{k-1}$ and $l_k$.
   k++;
   }
   if (gavRuleSet <> NULL) {
       $M_k$ = gavRuleSet;
$M_k$ is the mapping between the layers $l_{k-1}$ and $l_k$.
k++;
   }
   prevRelSet = curRelSet;
       dist++;
   } while (dist <= d)
```

The relation derivation graph is thus used to construct a specialized internal mapping system from the user-specified external, layered mapping system in such a way that GAV and LAV layers are cleanly separated. Once the layers get separated, the query translation algorithm can use standard GAV and LAV translation schemes, to progressively transform a user query into an equivalent (rather, maximally contained) query on source databases. The translated query can either be directly executed or converted into an equivalent data-flow graph that can be exported to third-party BTL tools and executed.

Case 4: Supporting Inheritance-Inheritance with Complete Condition

Suppose A is the super class of B and C and the inheritance is complete, in the sense that the union of the set of instances of B and the set of instances of C is always equal to the set of instances of A. In this case the mapping between A, B, C can be used as both GAV mappings and LAV mappings. We denote such rules as $GAV^{LAV}$ rules.

$GAV^{LAV}$ Rules:

$A:-B$ $A:-C$

These rules can be used as a GAV mapping to access A, and LAV mappings to access B or C (in exactly those queries where B OR C is required).

If we directly construct the relation derivation graph from these rules we will end up with cycles. The key insight here is that these rules are not really cyclic (or recursive); they only specify derivation paths. For the purpose of derivation we can rewrite the above rules into the following equivalent rules without any loss of generality:

GAV Rule:

$A:-B$ $A:-C$

LAV Rule:

$A':-B$ $A':-C$

Where, in the constructed relation derivation DAG, A' will have a copy of all the outgoing edges of A, except the ones corresponding to the above GAV rule.

Figure 500:
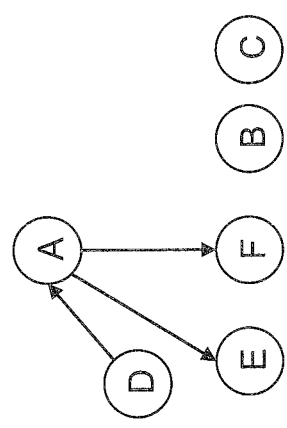
FIG. 500 is a representation of DAG in support of one of the embodiments of the present invention.
Figure 600:
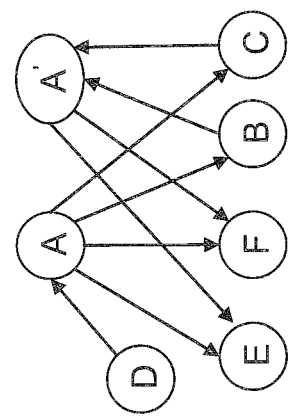
FIG. 600 is a DAG constructed after encoding inheritance relationship as illustrated in one of the embodiments of the present invention.

E.g. Suppose we had the DAG as shown in FIG. 500 excluding the above inheritance relationship. After encoding the inheritance relationship we have the DAG as shown in FIG. 600.

Let $M_i$ be the set of mapping rules so constructed to codify inheritance.

From $M_l \cup M_g \cup Mi$ the relation derivation DAG is constructed and from there the mapping layers. Proof of maximal containment follows from the earlier mentioned theorem.

Case 5: Supporting Inheritance—Conditional Inheritance

Suppose A is the super class of B and C, and C has a conditional inheritance from A,
i.e. all instances of A that satisfy a given condition are also instances of C. This can be mapped using the following rules in relational form:

$A:-B$ $A:-C$ $C:-A$,<inheritance condition>

The last rule can be used for both GAV mapping (to access C instances using A), and LAV mapping (to access A instances that satisfy the condition using C instances). If the relation derivation graph is directly constructed from these rules it will result in cycles. Again, the insight here is that these rules are not really cyclic (or recursive); they only specify derivation paths. For the purpose of derivation the above rules cab be rewritten into the following equivalent rules without any loss of generality:

GAV Rules:

$A:-B$ $A:-C$ $C:-A'$,<inheritance conditions

LAV Rule:

$C:-A$,<inheritance condition>

Where, in the constructed relation derivation DAG, A' will have a copy of all the outgoing edges of A, except the ones corresponding to the above GAV rules, and similarly C will have a copy of all the outgoing edges of C, except the ones corresponding to the above GAV rules.

Let $M_i$ be the set of mapping rules so constructed to codify inheritance.

From $M_l \cup M_g \cup Mi$ we construct the relation derivation DAG and from there the mapping layers.

Proof of maximal containment follows from the earlier mentioned theorem.

Case 6: Supporting Associations —*:* Associations

Suppose a is a *:* association between classes C and D.

In the relational representation we assume that there exists a relation $a_r$ corresponding to the association a with the following attributes:

$a_r(srcId,tgtId)$

Where srcId represents the ID of the source object and tgtId represents the ID of the target object (it is assumed that the relational representation of a concept has an implicit ID attribute).

The association is represented as a couple of GAV mappings between the corresponding relations:

$C(id(v),\_*):-a_r(srcId(v),\_),$ $D(id(v),\_*):-a_r(\_,tgtId(v))$

Let $M_a$ be the set of mapping rules so constructed to codify associations.

From $M_l \cup M_g \cup Mi \cup Ma$ we construct the relation derivation DAG and from there the mapping layers. Proof of maximal containment follows from the earlier mentioned theorem.

Case 7: Supporting Associations —*:1 associations

Suppose a is a *:1 association between classes C and D.

The association is represented as the following GAV mappings:

$C(id(v),\_*):-a_r(srcId(v),\_)$ $D(id(v),\_*):-a_r(\_,tgtId(v))$ $a_r(srcId(v),tgtId(f(v))):-C(id(v),\_*)$ Where f( ) is a unique skolem function that given the ID of a C instance gives the ID of the D instance that is associated with it.

Essentially, the last rule allows us to infer the existence of the '1' side object given the existence of a '*' side object.

If the relation derivation graph is directly constructed from these rules it will end up with cycles. Again, the insight here is that these rules are not really cyclic (or recursive); they only specify derivation paths. For the purpose of derivation the above rules can be rewritten into the following equivalent rules without any loss of generality:

$$C(id(v),\_*) :- a_r(srcld(v),\_)$$

$$D(id(v),\_*) :- a_r(\_,tgtld(v))$$

$$a_r(srcld(v),tgtld(f(v))) :- C'(id(v),\_*)$$

Where, in the constructed relation derivation DAG, C' will have a copy of all the outgoing edges of C, except the ones corresponding to the above GAV rule.

Let $M_a$ be the set of mapping rules so constructed to codify associations.

From $M_l \cup M_g \cup Mi \cup Ma$ we construct the relation derivation DAG and from there the mapping layers. Proof of maximal containment follows from the earlier theorem.

Working Example of the Invention

In a preferred embodiment of the present invention, model representations as implemented by a query language to provide a unified view of data is provided. The embodiment aims to aggregate health-care information of individuals from different sources for further analysis.

Let's say for example a person's disease history, medication history, surgical history and health records of his close relations are desired to be tracked in order to analyze his family history. Suppose the data records available are: a clinical records database that records treatment history, i.e. what diseases a person has had and what medication was given; a hospital records database that records a person's surgical history, i.e. what surgeries a person has had over time; a medical encyclopaedia that contains information about various diseases, surgical procedures and medicines and their relationships; a census database that contains basic information about a person, such as his date of birth, father, mother, etc.

Figure 700:
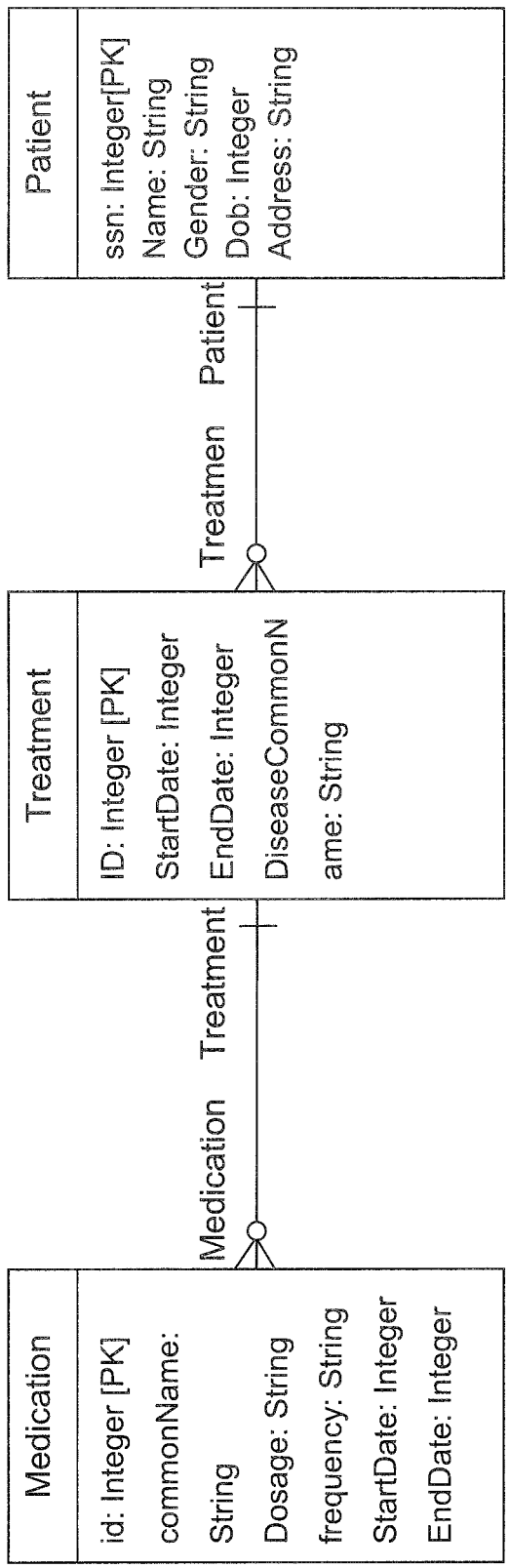
FIG. 700 is a diagram representing the conceptual modeling of clinical records in a preferred embodiment of the invention.
Figure 701:
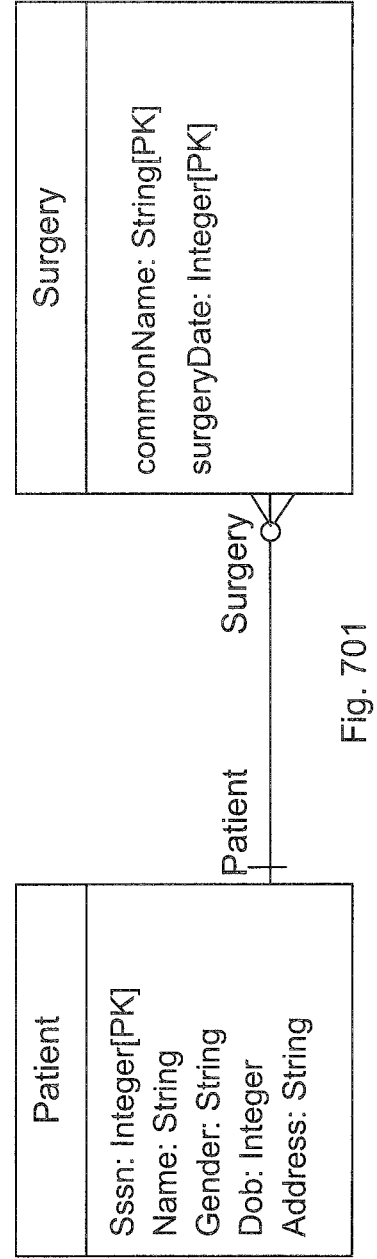
FIG. 701 is a diagram representing the conceptual modeling of hospital records in a preferred embodiment of the invention.
Figure 702:
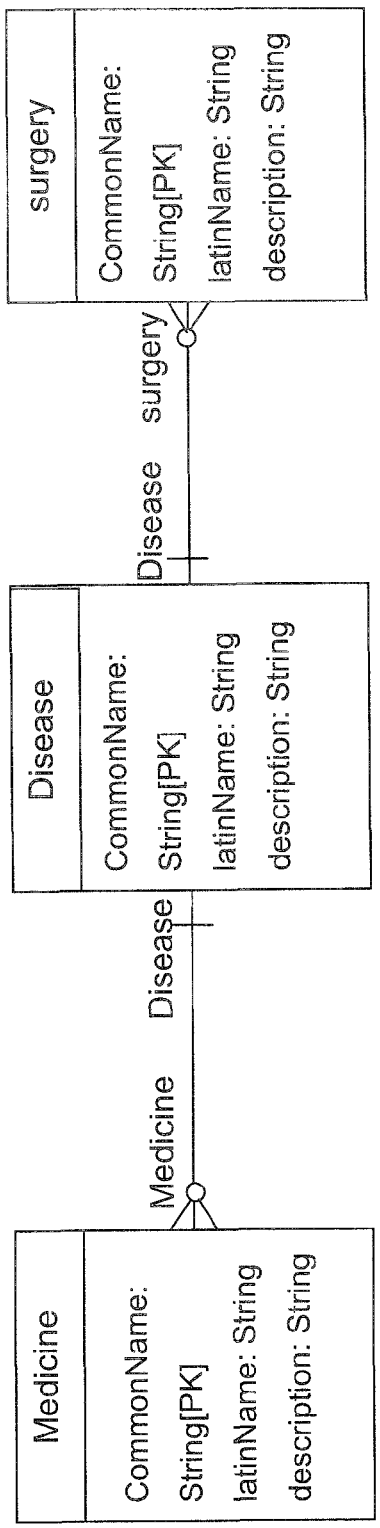
FIG. 702 is a diagram representing the conceptual modeling of medical encyclopedia in a preferred embodiment of the invention.
Figure 703:
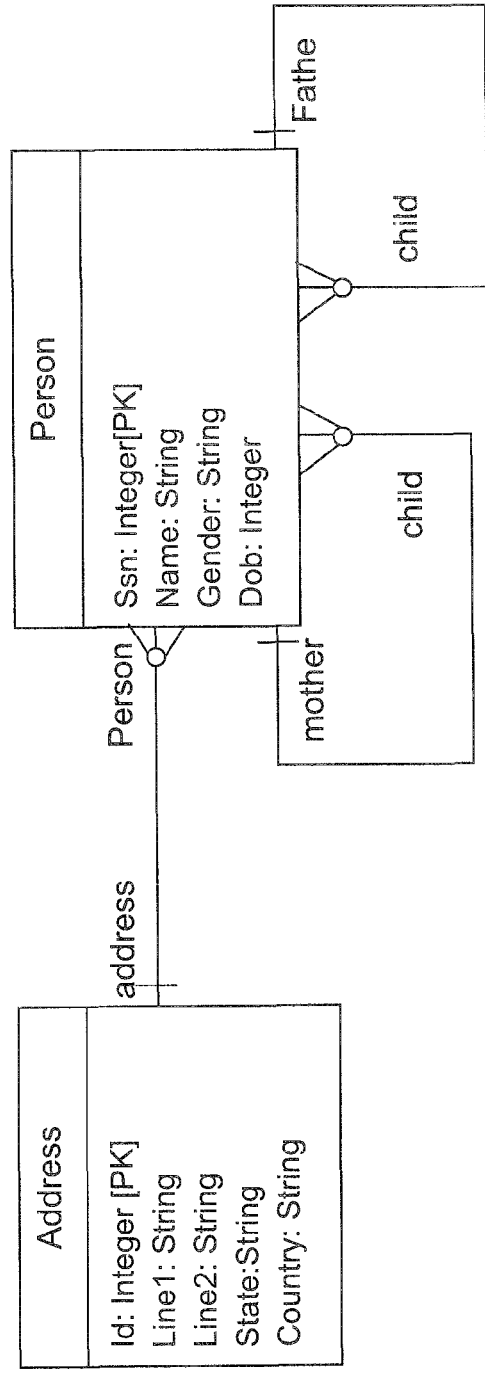
FIG. 703 is a diagram representing the conceptual modeling of census records in a preferred embodiment of the invention.

Turning to FIG. 700-FIG. 703, conceptual modelling among the source databases is shown. Say for example FIG. 700 illustrates conceptual model for the clinical records; FIG. 701 illustrates conceptual model for hospital records; FIG. 702 shows a conceptual model of a medical encyclopaedia and FIG. 703 represents a conceptual model of the census record. Corresponding to each conceptual model exists a physical model. FIG. 704 is a diagrammatic representation of physical model of one of the databases, in the present case being of a census record database.

Figure 800:
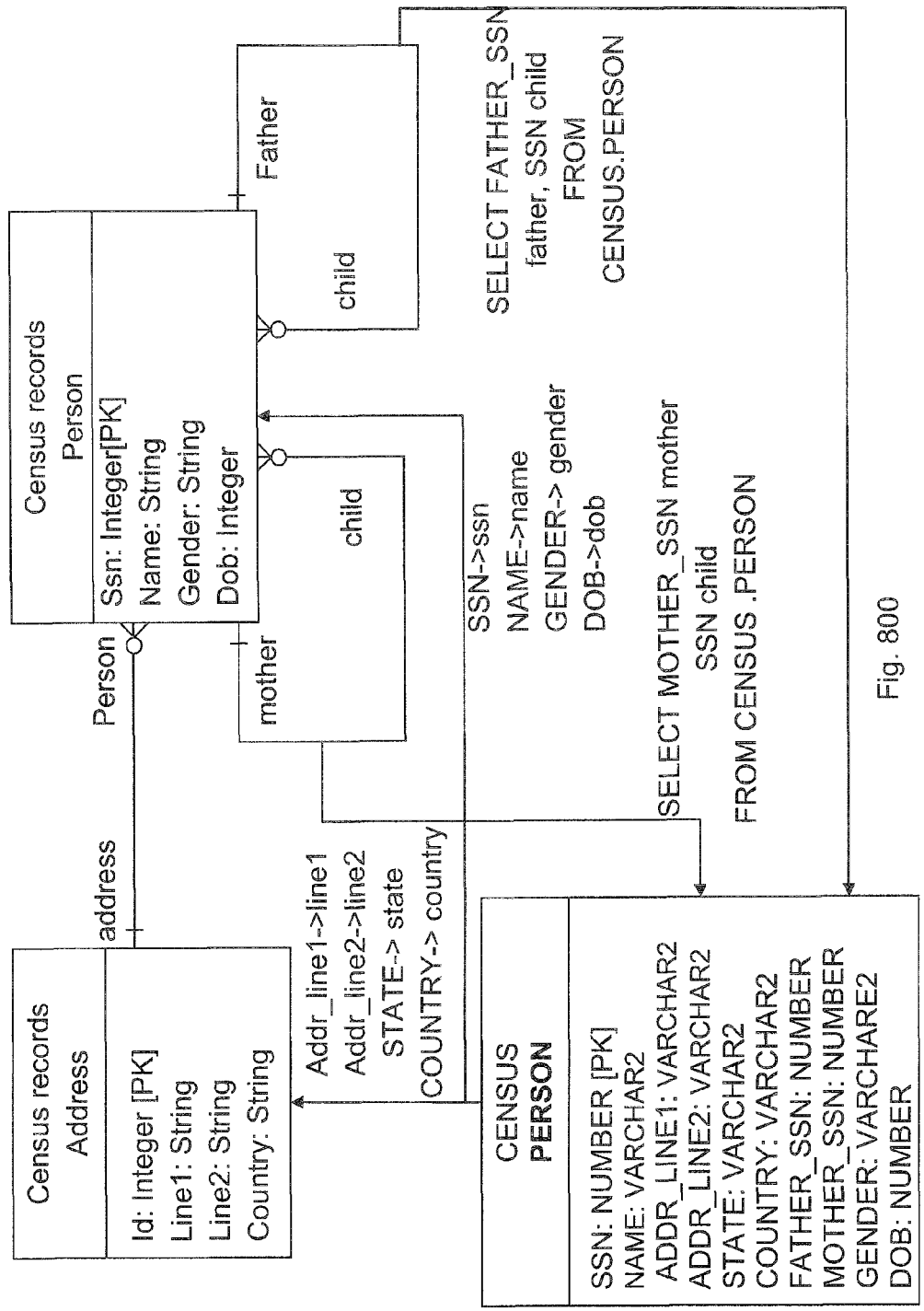
FIG. 800 represents mapping between conceptual and physical models embodying the present invention.
Figure 900:
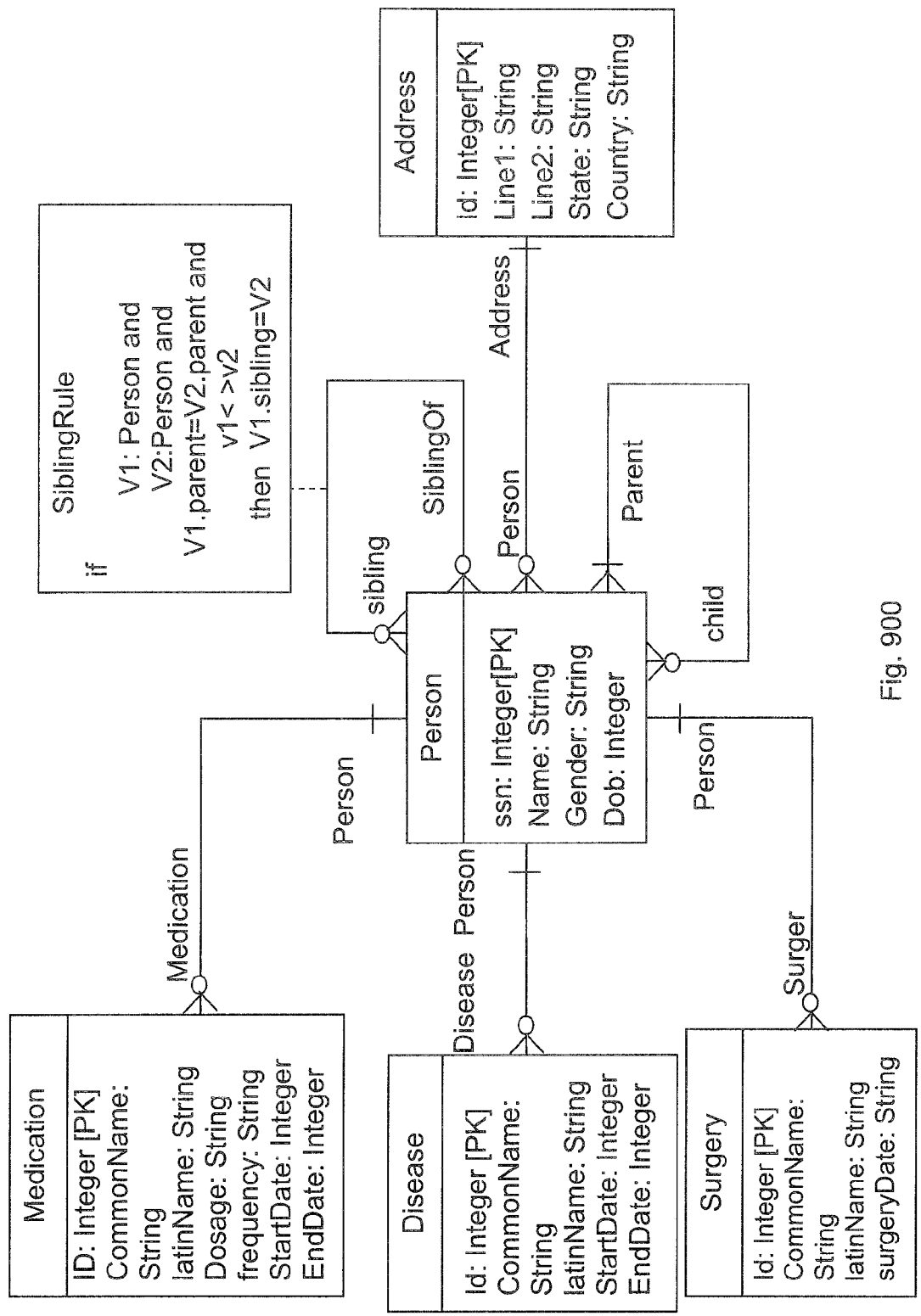
FIG. 900 is a diagrammatic representation of a unified conceptual model of the data i.e. health care records in a preferred embodiment of the present invention.

Next, FIG. 800 represents the mapping between the census conceptual and physical model. Similarly, mapping exists between the physical models of given databases i.e. clinical records, hospital records and medical encyclopaedia and the corresponding conceptual models. Once the mappings are established a unified conceptual model of the personal health records is generated as shown in FIG. 900. The conceptual modelling framework allows the user to define certain mapping rules; say for, in the present case the sibling rule is captured which defines when two persons can be considered as siblings. Such rules are taken into account during subsequent query translation.

Next, the unified conceptual model as obtained above is mapped to source specific conceptual models of FIGS. 700, 701, 702 and 703. Now, suppose the following given query is to be executed on the above obtained unified conceptual model 900 to get a list of all siblings who suffered from the same disease.

'Diseases Among Siblings' Query:
select d.commonName,
　p1.name,
　p2.name
from Person p1, Person p2, Disease d
where p1.disease=d
and p2.disease.commonName=d.commonName
and p1.sibling=p2

Query translator, first translates this into an equivalent query on source data bases. The translated query is then converted to a data-flow graph for execution. The query translator first constructs the relation derivation graph from the model mappings and rules; then from the graph generates a set of intermediate mapping layers, and then translates the query down these mapping layers alternating between GAV and LAV expansions. The translated query is much more complex than the input query, as it has to process the census information to derive sibling pairs, and then check if they both had the same disease, first by checking in the clinical database and then in the surgical database and medical encyclopaedia, and their various combinations.

Thus, processing a directed acyclic graph generates the translated query which is further translated into a data flow graph to obtain results corresponding to the "disease among siblings" query.

The solution provided by the embodiments of the invention presents means to model enterprise data integration systems in a more holistic manner, from lowest level operational systems to higher level enterprise structures, providing a unified view of data at each level. The query rewriting algorithm presented in the present disclosure provides a scalable solution to materialize unified data views at the enterprise level and at any intermediate level. Conceptual models provide a means to capture and process the semantic intent of data more accurately thereby reducing the integration errors significantly. The techniques provided by the embodiments of the invention can be applied for answering queries through a virtual target schema.

The present invention therefore reduces the efforts and time employed in creating warehouses at each level of an enterprise and maintaining them. Further, it preserves consistency of data whenever a unified view of the data needs to be obtained. Moreover, experimental evaluation demonstrate that the system scales well with increasing complexities of the mapping scenario and the target query, and is practical in a real data integration scenario.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

The invention claimed is:

1. A method of providing a unified view of data existing in multi layered hierarchical structure in an enterprise application by modeling the data at multiple levels of abstraction and capturing the relationships existing between the modeled data, the method comprising the processor implemented steps of:

defining a global schema using a conceptual modeling framework to provide an aggregated view of the data;

defining a source schema at multiple levels using a conceptual model for at least one level and a relational model or a conceptual model for subsequent levels;

capturing a relationship between data existing at multiple levels within an hierarchical structure;

establishing mappings and mapping rules to codify captured relationships existing between the defined global schema and set of source schema;

initializing a query on the global schema and rewriting into an equivalent source schema such that the query in the source schema is maximally contained in the global schema;

capturing relationship derivation dependencies between the data contained in the defined global schema and source schema by constructing a directed acyclic graph from the established mapping rules and conceptual models;

processing the directed acyclic graph to construct a mapping system, the mapping system having alternate global-as-view (GAV) and local-as-view (LAV) mapping layers;

translating the queries down multiple levels of the conceptual model into physical model queries by applying the obtained alternate GAV and LAV mapping layers; and executing the translated physical model query either directly or indirectly by translating the query into a data flow graph that can optionally be exported into third party Extract, Transform, Load (ETL) tools.

2. The method of claim 1, wherein the conceptual modeling language is selected from any of the object model or extended entity-relationship model.

3. The method of claim 1, wherein object query language is chosen as a query language.

4. The method of claim 1, wherein the query can be initialized at any intermediate levels within a hierarchical classification structure.

5. The method of claim 1, wherein the relationships captured between data at multiple levels include any of association relationship, inheritance relationship or aggregation relationship.

6. The method of claim 1, wherein the mapping between modeling framework is selected from any one of Global-as-view mapping where a relation at some level is specified as a view over a set of relations at next lower level;

Local-as-view mapping where a relation at some level is specified as a view at next higher level;

Combination of said global-as-view and local-as-view mapping to relate relations of adjacent levels;

Subtype relationship where a set of relations at a lower level are specified as subtypes of relations at next higher level;

Or a combination thereof.

7. The method of claim 4, wherein the combination of global-as-view and local-as-view mapping is achieved by:

partitioning the global schema and source schema into two or more subsets;

introducing a plurality of pseudo intermediate layers between the partitioned global schema and source schema, the layers containing replicas of subsets obtained from partitioning the global schema and source schema;

initializing local-as-view mapping between the global schema and the pseudo intermediate layer by establishing one to one mapping between a subset of the global schema for which a replica is created in the pseudo intermediate layer and the replica;

local-as-view mapping between the subsets contained within the global schema and a replica of a subset of source schema which is required to be mapped with a selected subset of the global schema;

initializing global-as-view mapping between the pseudo intermediate layer and source schema by establishing one to one mapping between the subsets of the local schema for which a replica is created in the pseudo intermediate layer and the replica;

global-as-view mapping between the subsets contained within the source schema and a replica of a subset of global schema which is required to be mapped with the selected subset of the source schema.

8. The method of claim 1, wherein an inheritance relationship between the classes contained within the global and source schema is specified as a combination of global-as-view and local-as-view mapping.

9. The method of claim 6, wherein the number of mapping rules defining the inheritance relationship between the classes corresponds to the number of sub classes inheriting from a super class.

10. The method of claim 1, wherein the established mapping rules to define the inheritance relationship are not cyclic.

11. The method of claim 1, wherein the directed acyclic graph is constructed in the steps of:

identifying a set of relations and mapping rules wherein each mapping rule is identified by a unique number;

capturing relation dependencies within a given set of relations to construct a graph;

defining nodes of the graph as the relations and edges by the mapping type and the mapping rule number.

12. The method of claim 1, wherein the indirect execution of the query relates to conversion of the translated query into a data flow graph and the exportation of the data flow graph to the third party integrating platform ETL specification and executing the ETL thereon.

13. A system for providing a unified view of data existing in multi layered hierarchical structure by modeling data at multiple levels of abstraction and capturing the relationships existing between the data models within an enterprise application, the system comprising:

a processor for executing the program instructions to:

capture a relationship between defined global schema and source schema and mapping rules governing the mapping between the global schema and source schema;

construct a directed acyclic graph to derive relation derivation dependencies based on established mapping rules;

initialize a query on global schema into equivalent source schema;

translate the query down multiple hierarchical levels for execution within a communication network; and aggregate the results from the set of source queries during query run time and display the translated query and results to the user using a display device.

14. The system of claim 13, wherein the processor rewrites the target query into an equivalent set of source queries using the established mapping rules and captured relationships between the global and source schema.

15. The system of claim 13, wherein the source schema comprises either an inheritance relationship or an association relationship or an aggregate relationship.

16. The system of claim 13, wherein the computer readable program storage device tangibly embodies a set of program instructions executable by said computer to perform a method of providing a unified view of data.

* * * * *